United States Patent
Tanaka

(10) Patent No.: US 8,531,271 B2
(45) Date of Patent: Sep. 10, 2013

(54) RFID CARRIER SENSING METHOD AND RFID SYSTEM USING THIS RFID CARRIER SENSING METHOD

(75) Inventor: Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1203 days.

(21) Appl. No.: 11/878,925

(22) Filed: Jul. 27, 2007

(65) Prior Publication Data
US 2007/0279193 A1  Dec. 6, 2007

Related U.S. Application Data

(63) Continuation of application No. PCT/JP2005/001319, filed on Jan. 31, 2005.

(51) Int. Cl.
*H04Q 5/22* (2006.01)

(52) U.S. Cl.
USPC .................. 340/10.1; 340/10.2; 340/10.3

(58) Field of Classification Search
USPC .............. 340/10.1, 10.2, 10.3; 370/334, 335, 370/336, 337, 338, 339, 340, 341, 342, 343, 370/344
See application file for complete search history.

(56) References Cited

U.S. PATENT DOCUMENTS

| | | | |
|---|---|---|---|
| 6,255,993 B1 | 7/2001 | Greeff et al. | |
| 6,894,616 B1 * | 5/2005 | Forster | 340/572.1 |
| 2005/0099269 A1 * | 5/2005 | Diorio et al. | 340/10.51 |
| 2006/0015910 A1 * | 1/2006 | Onomatsu et al. | 725/72 |

FOREIGN PATENT DOCUMENTS

| | | | |
|---|---|---|---|
| JP | 10-075196 | * | 3/1998 |
| JP | 10075196 | | 3/1998 |
| JP | 10293824 | | 4/1998 |
| JP | 10-293824 | | 11/1998 |
| JP | 2000307466 | | 2/2000 |
| JP | 2000-307466 | * | 11/2000 |
| JP | 2001-111448 | * | 4/2001 |
| JP | 2001111448 | | 4/2001 |
| JP | 2003-506948 | | 2/2003 |
| WO | WO 01-09640 | | 2/2001 |
| WO | 0150407 | | 12/2001 |

OTHER PUBLICATIONS

Electromagnetic compatibility and Radio spectrum Matters ERM: Radio Frequency Identification Equipment operating in the band 865 MHz to 868 MHz with power levels up to 2 W; Part 1: Technical requirements and methods of measurement; ETSI EN 302 208-1; Sep. 2004.*

(Continued)

*Primary Examiner* — Brian Zimmerman
*Assistant Examiner* — Omer S Khan
(74) *Attorney, Agent, or Firm* — Smith, Gambrell & Russell, LLP

(57) ABSTRACT

An RFID system that is capable of increasing the probability of a spare channel being detected and reducing the influence of interference between reader/writers comprises: a reader/writer which has a reader/writer main body section and an antenna capable of polarization switching, and which sends a continuous carrier wave; and a tag which uses tag information to modulate the continuous carrier wave and sends back a response signal to the reader/writer. The reader/writer main body section judges the level of a received interference signal and determines a channel and polarization direction for which the level of the interference signal is equal to or less than a threshold value, and receives a response signal from the tag on the determined channel and in the polarization direction.

4 Claims, 8 Drawing Sheets

(56) References Cited

OTHER PUBLICATIONS

European Search Report for Application No. 05709482.3 (dated Nov. 20, 2008).

Japanese Office Action for Application No. 2007-501450 (dated Nov. 11, 2008).

ETSI EN 302 208-1 V1.1.1 (Sep. 2004); Electromagnetic compatibility and Radio spectrum Matters (ERM); Radio Frequency Identification Equipment operating in the band 865 MHz to 868 MHz with power level up to 2W; Part 1: Technical requirements and methods of measurement.

Chinese Office Action dated Aug. 3, 2010, in corresponding Chinese Application No. 200580047503.3.

Chinese Office Action dated Sep. 1, 2011 for application No. 200580047503.3.

* cited by examiner

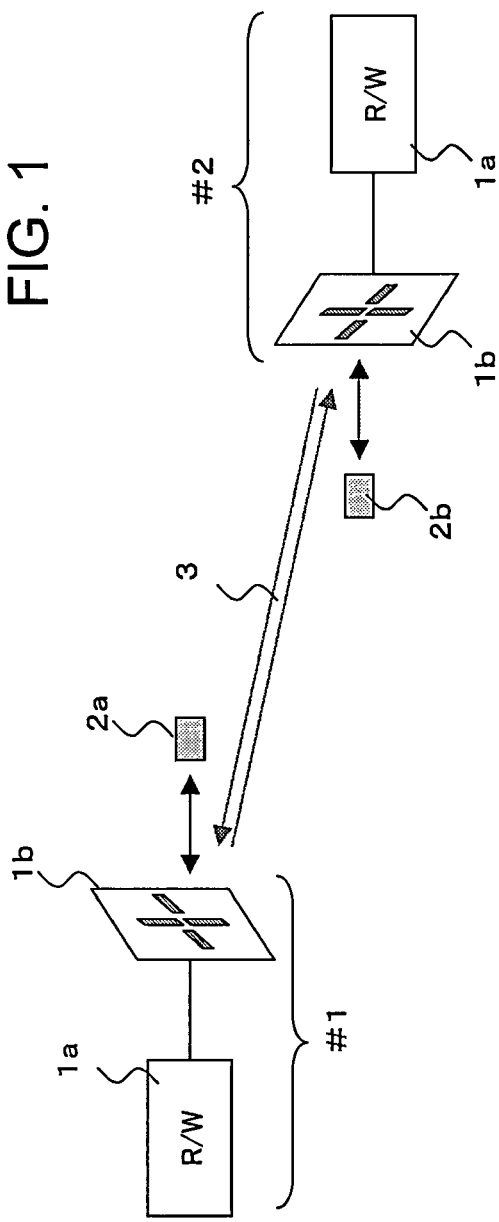

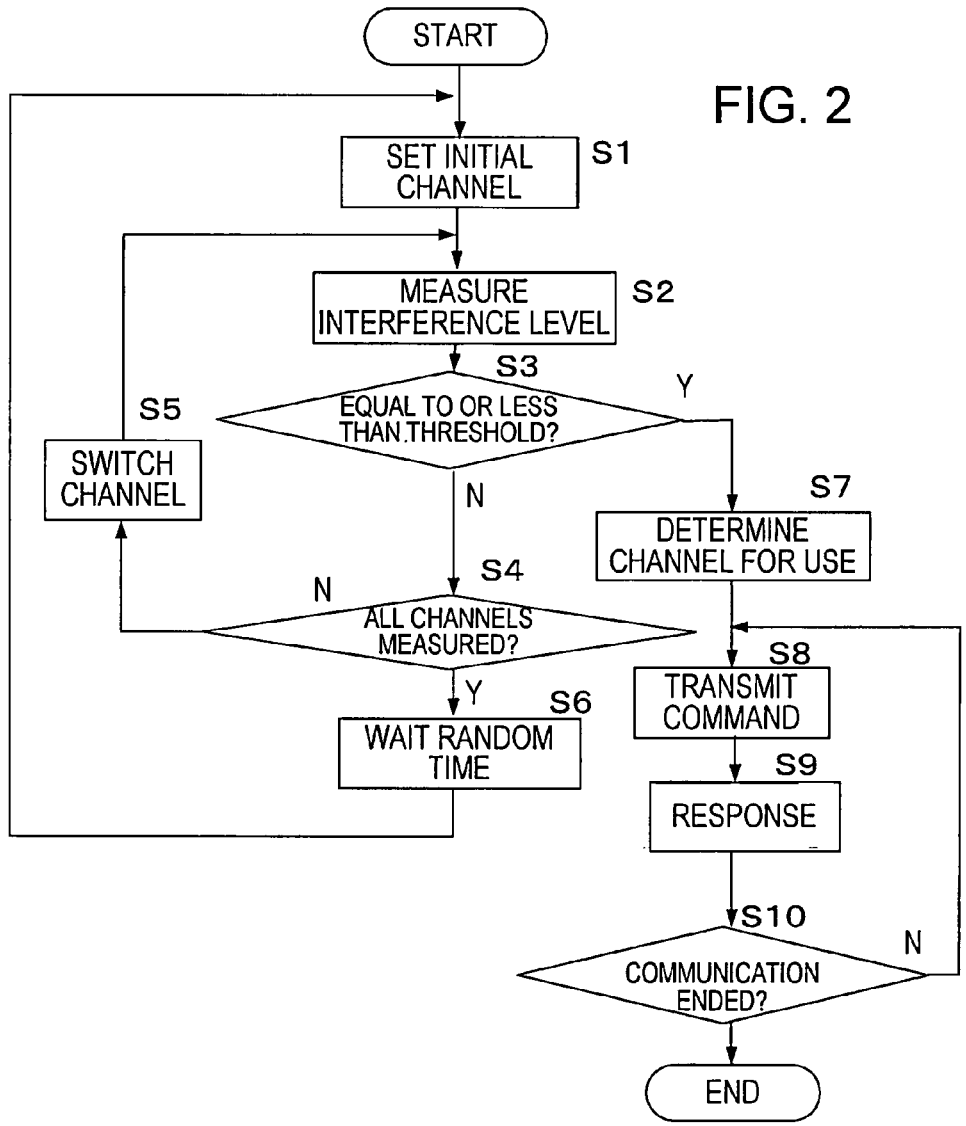

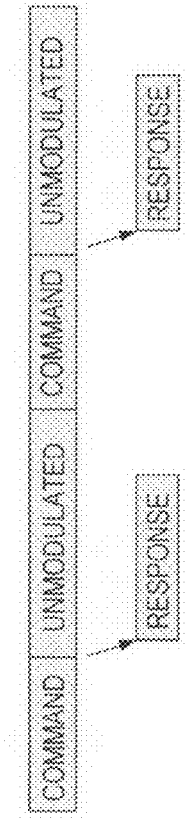
FIG. 3A R/W TRANSMISSION (RIGHT-CIRCULAR POLARIZATION)
FIG. 3B TAG TRANSMISSION
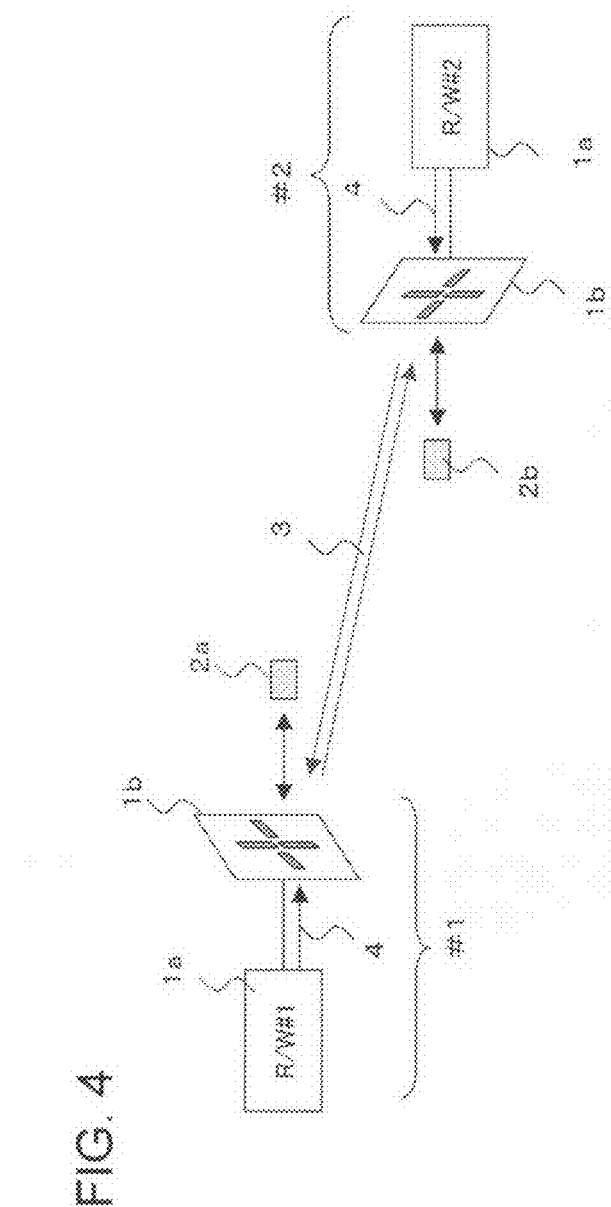
FIG. 4

RFID CARRIER SENSING METHOD AND RFID SYSTEM USING THIS RFID CARRIER SENSING METHOD

CROSS-REFERENCE TO RELATED APPLICATIONS

This application is a continuation of international application PCT/JP2005/001319, filed on Jan. 31, 2005.

TECHNICAL FIELD

The present invention relates to a radio frequency ID (RFID: Radio Frequency Identification) carrier sensing method and an RFID reader/writer and RFID system that employ the radio frequency ID.

BACKGROUND ART

In recent years, in the reading of ID information that is recorded on tags, systems that perform reading by utilizing magnetic coupling with tags or RFID systems that use wireless frequencies to read tag information have been developed and operated.

For the latter RFID system that performs reading by using wireless frequencies, European standards have been disclosed by the ETSI (European Telecommunications Standards Institute) (Draft ETSI EN 302 208-1V1.1.1 (2003-12)) as an example. The usage of an RFID system that employs the 865 MHz to 868 MHz band at a maximum power of 2 W was disclosed in Draft ETSI EN 302 208-1V1.1.1 (2003-12).

Here, there are cases where a plurality of reader/writers are run adjacent to one another as an RFID system. FIG. 1 illustrates an example of this state.

In FIG. 1, a signal transmitted by the respective reader/writer #1 (#2) has an interference 3 with respect to the other reader/writer #2 (#1), and there is the problem that the reception performance of the reader/writers #1 and #2 deteriorates. In order to deal with this problem, carrier sensing is carried out before transmission in order to reduce the effect of interference 3 and a search for a frequency channel that is not being used by the other reader/writer #2 (#1) is performed. Further, a method that uses a spare channel if one exists and waits until a spare channel is found if none exists has been adopted.

In other words, FIG. 2 illustrates a method using such carrier sensing. FIG. 2 is a reading operation flowchart for tag information of individual reader/writers in FIG. 1.

According to FIG. 2, each of the reader/writers #1 and #2 is constituted by a reader/writer main body section 1a and an antenna 1b.

First, an initial channel (frequency bandwidth) is set by the reader/writer main body section 1a (step S1) and the level of the carrier received by the antenna 1b in the initial channel thus set is measured as an interference signal (step S2). If the level of the interference signal is equal to or more than a threshold value (step S3, N), this channel cannot be used and, therefore, the interference level of another channel is the measurement target. In other words, it is judged whether measurement for all of the channels has already been performed and, if channels for which measurement has not been performed exist (step S4, N), the channels are switched in sequence (step S5) in order to return to the same interference level measurement (step S2).

In cases where measurement of all of the channels has already been carried out (step S4, Y), the wait time is randomly set (step S6), the processing returns once again to the initial channel setting (step S1) after the set wait time has elapsed, and the processing is repeated.

If the interference level is equal to or less than a threshold value (step S3, Y) in the interference level measurement (step S2), a channel for which the interference level is equal to or less than the threshold value is determined (step S7) and a command signal is transmitted (step S8).

FIG. 3 illustrates a command signal emitted by the antenna 1b of the reader/writer #1 (#2) and a response signal from tag 2a (2b). As shown in FIG. 3A, the reader/writers #1 and #2 transmit an unmodulated continuous wave CW and modulate this unmodulated continuous wave CW by means of a command signal so that the continuous wave CW is transmitted using fixed right-handed polarization, for example, by antenna 1b.

Upon receipt of command signals from the corresponding reader/writers #1 and #2, tags 2a and 2b respond by modulating unmodulated continuous carrier wave CW by taking characteristic information that contains information identifying the good (ID) to which the tag belongs as tag information (see step S9: FIG. 3B). Reader/writers #1 and #2 receive this response signal and end the communications (step S10).

In addition, another method that is used is a method according to which a control device centrally controls a plurality of reader/writers #1 and #2 and controls the transmission timing of the respective reader/writers.

A former method that proceeds according to the flow of FIG. 2, i.e. which involves performing carrier sensing as described hereinabove to search for a frequency channel that is not being used by another reader/writer and using a spare channel if such a channel exists has been confronted by the problem that there is a large number of reader/writers and the wait time is long. In addition, in the case of the latter method that involves performing centralized control by means of a control device, when a large number of reader/writers exist, there is the problem that the allocated communication time is short.

DISCLOSURE OF THE INVENTION

Therefore, an object of the present invention is to eliminate the problems, even when a plurality of reader/writers are present in the RFID system, of the long transmission timing wait times of respective reader/writers or the short communication times allocated to these reader/writers and to reduce the influence of mutual interference that occurs when a plurality of reader/writers are adjacent to one another.

An RFID system that solves the above problem has, as a first aspect, a reader/writer which has a reader/writer main body section and an antenna capable of polarization switching and which sends a continuous carrier wave; and a tag which uses tag information to modulate the continuous carrier wave and sends back a response signal to the reader/writer, wherein the reader/writer main body section judges the level of a received interference signal and determines a channel and polarization direction for which the level of the interference signal is equal to or less than a threshold value, and receives a response signal from the tag in the determined channel and polarization direction.

According to a second aspect, the RFID system that solves the above problem according to the first aspect is such that the antenna capable of polarization switching is capable of switching between right-handed circular polarization and a left-handed circular polarization; and the reader/writer main body section detects a channel for which the level of the interference signal to be received is equal to or less than the threshold value in the case of either the right-handed circular polarization or the left-handed circular polarization.

According to a third aspect, the RFID system that solves the above problem according to the first aspect is such that the antenna capable of polarization switching is capable of switching between horizontal polarization and vertical polarization; and the reader/writer main body section detects a channel for which the level of the interference signal to be received is equal to or less than the threshold value in the case of either the horizontal polarization or the vertical polarization.

According to a fourth aspect, the RFID system that solves the above problem has a reader/writer which has a reader/writer main body section and a plurality of antennae each with characteristic polarization and which sends a continuous carrier wave; and a tag which uses tag information to modulate the continuous carrier wave and sends back a response signal to the reader/writer, wherein the reader/writer main body section judges the level of the interference signal to be received by each of the plurality of antennae for each of the plurality of channels and determines a spare channel and antenna for which the judged level of the interference signal is equal to or less than the threshold value, and receives a response signal from the tag by means of the determined antenna via the determined channel.

According to a fifth aspect, the RFID system that solves the above problem is the RFID system according to any of aspects 1 to 4, wherein the channels are respective bands of a frequency band that has been divided into a plurality of bandwidths.

According to a sixth aspect, the RFID system that solves the above problem is the RFID system according to any of aspects 1 to 4, wherein the tag is constituted by a patch antenna and an LSI which is connected in parallel to the patch antenna and an interface section having a capacitance component that resonates with the inductance component.

A carrier sensing method of the RFID system that solves the above problem is a carrier sensing method of an RFID system which has, for the first aspect, a reader/writer that has a reader/writer main body section and an antenna capable of polarization switching and which sends a continuous carrier wave, and a tag that uses tag information to modulate the continuous carrier wave and sends back a response signal to the reader/writer, the method having the steps of: in the reader/writer, sequentially measuring the interference signal level using a specified channel for all of the switchable polarization of the antenna; measuring the interference signal level by switching the specified channel to another channel when the interference signal level to be measured is equal to or more than the threshold value; determining a channel and polarization direction for which the interference signal level thus measured does not exceed the threshold value; and setting to receive a continuous carrier wave that has been modulated using the tag information that is sent back from the tag via the determined channel and in the determined antenna polarization direction.

The carrier sensing method of the RFID system that solves the above problem is a carrier sensing method of an RFID system which, for the second aspect, has a reader/writer that has a reader/writer main body section and a plurality of antennae each set with a different polarization direction and which sends a continuous carrier wave, and a tag that uses tag information to modulate the continuous carrier wave and sends back a response signal to the reader/writer, the method having the steps of: in the reader/writer, sequentially measuring the interference signal level using a specified channel for the respective polarization of the plurality of antennae; measuring the interference signal level by switching the specified channel to another channel when the interference signal level to be measured is equal to or more than the threshold value; determining an antenna set to a channel and polarization direction for which the interference signal level thus measured does not exceed the threshold value; and setting to receive the response signal from the tag using the determined channel and antenna.

The first aspect of the reader/writer that solves the above-problem is a reader/writer of a RFID-system which has a reader/writer main body section and an antenna capable of polarization switching and which sends a continuous carrier wave to a tag, wherein the level of a received interference signal is judged and a channel and polarization direction for the antenna for which the level of the interference signal is equal to or less than a threshold value are determined; and a response signal that is generated by using tag information to modulate the continuous carrier wave and sent back by the tag is received on the determined channel and in the determined polarization direction.

The second aspect of the reader/writer that solves the above problem is a reader/writer of an RFID system which has a reader/writer main body section and a plurality of antennae each with characteristic polarization and which sends a continuous carrier wave to a tag, wherein the reader/writer main body section judges the level of the interference signal received by each of the plurality of antennae for each of the plurality of channels and determines a spare channel and antenna for which the judged level of the interference signal is equal to or less than the threshold value; and the reader/writer main body section receives a response signal that is generated by using tag information to modulate the continuous carrier wave and which is sent back by the tag by means of the determined antenna via the determined channel.

The characteristics of the present invention will become further evident from the preferred embodiments that will be described in accordance with the drawings hereinbelow.

The present invention makes it possible to create a high probability that a spare channel will be detected and to reduce the influence of interference between the reader/writers.

BRIEF DESCRIPTION OF THE DRAWINGS

FIG. 1 describes a state example of a case where a plurality of reader/writers are operated adjacent to one another as an RFID system;

FIG. 2 describes a method of spare channel detection using carrier sensing;

FIG. 3 describes a command signal that is emitted by antenna 1b of the reader/writer #1 (#2) and a response signal from tag 2a(2b);

FIG. 4 illustrates the characteristics of the present invention in a case where a plurality of reader/writers #1 and #2 are operated adjacent to one another as an RFID system;

BEST MODE FOR CARRYING OUT THE INVENTION

An embodiment of the present invention will be described hereinbelow in accordance with the drawings. The embodiments described hereinbelow permit an understanding of the present invention and the technical scope of the present invention is not limited thereto.

FIG. 4 shows a case where a plurality of reader/writers #1 and #2 are operated adjacent to one another as a RFID system and, in contrast to FIG. 1, when carrier sensing is the characteristic of the present invention, a function 4 that controls the polarization direction of the antenna 1b of the reader/writer is provided.

Figure 5:
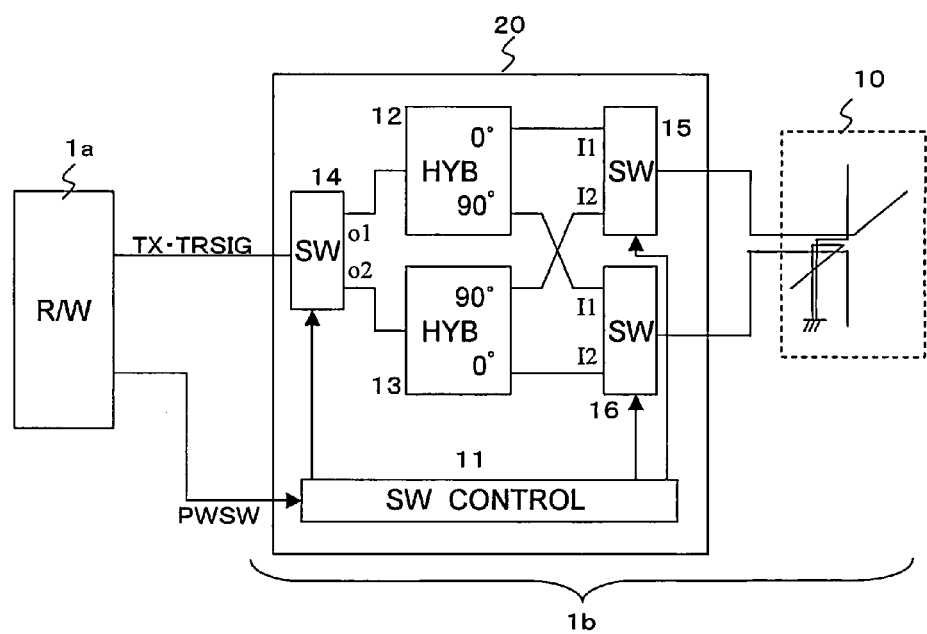
FIG. 5 is a conceptual view of a constitutional example of the reader/writer to which the present invention is applied.

FIG. 5 is a conceptual view of a constitutional example of the reader/writer #1 and #2 to which the present invention is applied.

In FIG. 5, antenna 1b comprises an antenna element 10, and a polarization direction control section 20. The polarization direction control section 20 shown in FIG. 5 has a function to switch the polarization direction of the antenna element 10 to right-handed circular polarization and left-handed circular polarization. The antenna element 10 comprises two orthogonal dipole antennae and the horizontal dipole antenna is connected to a switch 15 and the vertical dipole antenna is connected to a switch 16.

A reader/writer main body section 1a sends a transmission signal TXSIG to the transmission/reception switching switch 14 of the circular polarization control section 20 and inputs a reception signal TRSIG from the transmission/reception switching switch 14. In addition, the reader/writer main body section 1a sends a polarization switching signal PWSW to the switch control section 11 of the polarization direction control section 20.

The two hybrid circuits 12 and 13 each have the transmission signal TXSIG input thereto and output signals that are shifted through 0° and 90°. The switch control section 11 controls switching switches 14, 15, and 16 in accordance with the polarization switching signal PWSW from the reader/writer main body section 1a.

In other words, when the polarization switching signal PWSW that designates right-angled circular polarization is sent by the reader/writer main body section 1a to the switch control section 11, the switch control section 11 supplies a switch switching signal to the switches 14, 15, and 16 to validate the output terminal o1 of the switch 14 and the input terminal I1 to the switches 15 and 16.

Conversely, when a polarization switching signal PWSW that designates left-handed circular polarization is sent by reader/writer #1 to the switch control section 11, the switch control section 11 supplies a switch switching signal to the switches 14, 15, and 16 to render effective an output terminal o2 of switch 14 and the input terminal I2 to the switches 15 and 16.

Therefore, when a 0° phase-shift signal is supplied by switch 15 to the horizontal dipole antenna element of antenna 10 and a 90° phase-shift signal is supplied by switch 16 to the vertical dipole antenna element of antenna 10, right-handed circular polarization results. In contrast, when a 90° phase-shift signal is supplied by switch 15 to the horizontal dipole antenna element of antenna 10 and a 0° phase-shift signal is supplied by switch 16 to the vertical dipole antenna element of antenna 10, left-handed circular polarization is produced.

Figure 6:
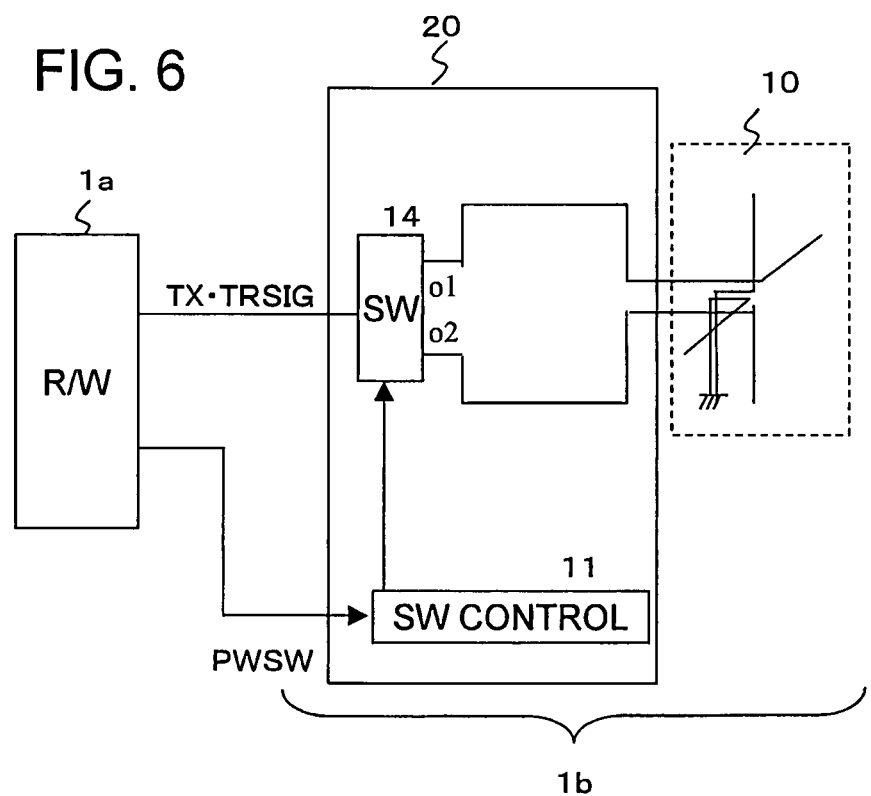
FIG. 6 is a conceptual view of a constitutional example of another reader/writer.

FIG. 6 is a conceptual view of a constitutional example of another reader/writer that comprises a function for controlling the switching of the polarization direction of antenna 10 between a horizontal wave and a vertical wave.

In FIG. 6, as per the embodiment in FIG. 5, antenna 1b comprises antenna element 10 and polarization direction control section 20. The reader/writer main body section 1a transmits a transmission signal TXSIG to the transceiver switching switch 14 of the polarization direction control section 20 and a reception signal TRSIG is input by the transceiver switching switch 14. In addition, the reader/writer main body section 1a sends horizontal and vertical polarization switching signals PWSW to the switching control section 11 of the polarization direction control section 20.

When the polarization switching signal PWSW that designates a horizontal wave is sent by the reader/writer main body section 1a to the switch control section 11, the switch control section 11 renders the output terminal o1 of the switch 14 effective to supply the polarization switching signal PWSW to the horizontal dipole antenna element of the antenna 10. Conversely, when the polarization switching signal PWSW that designates vertical polarization is sent by the reader/writer main body section 1a to the switch control section 11, the switch control section 11 renders the output terminal o2 of the switch 14 effective to supply this polarization switching signal PWSW to the vertical dipole antenna element of the antenna 10.

Thus, in the embodiment shown in FIG. 6, it is possible to switch the polarization direction of the antenna 10 to horizontal or vertical based on the polarized switching signal PWSW from the reader/writer main body section 1a and the antenna 10 can also be constituted simply by means of the constitution shown in FIG. 5.

Figure 7:
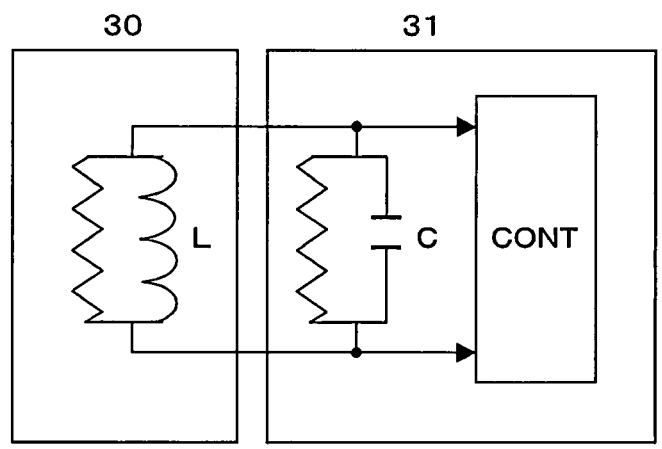
FIG. 7 is a conceptual block diagram of an embodiment of tag 2a(2b)

FIG. 7 is a conceptual block diagram of an embodiment of tag 2a(2b). Tag 2a(2b) is constituted by an antenna section 30 and an LSI chip 31. Antenna section 30 is, as an example, constituted by a patch antenna and has inductance L as an equivalence circuit. LSI chip 31 has a capacitance component C in the interface section.

The interface sections of the antenna section 30 and LSI chip 31 are connected in parallel. Therefore, if the inductance L of antenna section 30 and the capacitance component C of the interface section have a resonance relationship, the continuous wave CW sent by the reader/writer can be received and can be supplied at maximum power to a control section CONT of the LSI chip 31.

The control section CONT of the LSI chip 31 modulates the continuous wave CW by means of characteristic information including identification information on goods that are prepared tag accessories in accordance with power that is supplied, whereby it is possible to emit the resulting modulated continuous wave CW from antenna section 30 toward the reader/writer in the polarization direction (horizontal direction, for example) that is fixed.

The operation flow of an embodiment according to the present invention that is based on the premise of such a reader/writer and tag constitution will now be described in accordance with FIG. 8.

Figure 8:
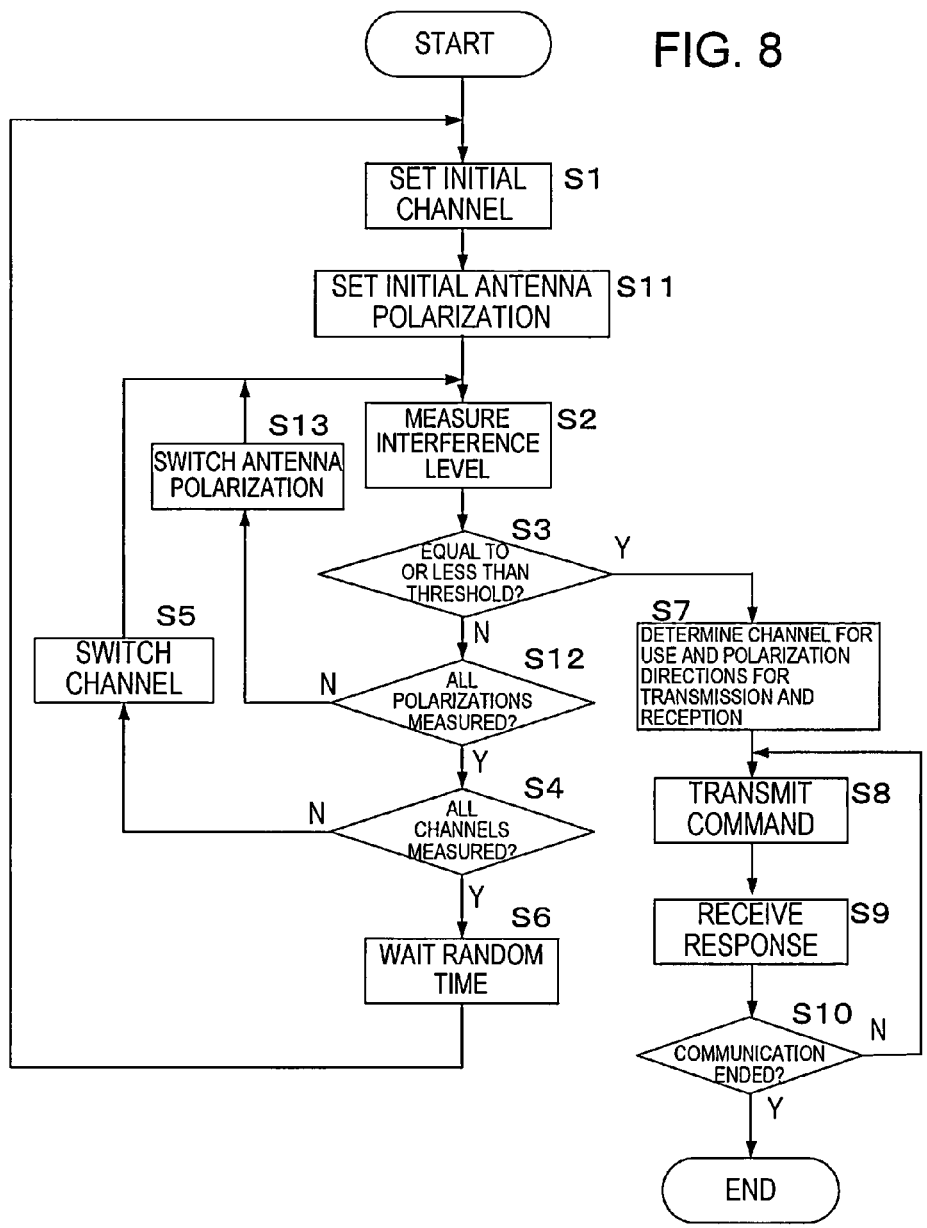
FIG. 8 is the operational flow of an embodiment of the present invention that is based on the premise of a reader/writer and tag constitution.

In FIG. 8, setting of the initial channel (frequency band) in the reader/writer main body section 1a is first made (step S1) and the initial antenna polarization is set (step S11). Now, when the initial antenna polarization is right-handed circular polarization, as described earlier, in the embodiment in FIG. 5, the switch control section 11 renders the output terminal o1 of switch 14 effective, and renders the 0° phase-shift output terminal of the hybrid circuit 12 and the input terminal I1 of switch 15 effective. Likewise, the switch control section 11 renders the 90° phase-shift output terminal of the hybrid circuit 12 and the input terminal I1 of switch 16 effective.

In setting of this kind, the level of the carrier received by antenna 10 is measured as the interference signal (step S2). If the interference signal level is equal to or more than a threshold value (steps S3 and N), this channel cannot be used.

Thereupon, the polarization direction for which measurement has not yet been carried out (in this case, the left-handed circular polarization direction) is judged without changing the channel (step S12) and the antenna polarization is switched to the left-handed circular polarization direction (step S13). Thus, the processing that follows the interference level measurement (step S2) is once again continued in the switched polarization direction.

Thus, so too in the measurement of all waves, if the level of the interference signal is equal to or more than a threshold value (step S3, N), the interference level of the other channel is the measurement target. In other words, if it is judged that measurement of all the channels has already been performed and if there is a channel for which measurement has not been performed (step S4, N), the channels are switched sequentially (step S5) and processing returns to the same interference level measurement (step S2).

In cases where measurement of all of the channels has already been performed (step S4, Y), the wait time is randomly set (step S6) and the processing again returns to the initial channel setting after the set wait time has elapsed (step S1) and the above processing is repeated.

In addition, if the interference level is equal to or less than the threshold value (step S3, Y) in the interference level measurement (step S2), a usage channel for which the interference level is equal to or less than a threshold value and the antenna polarization direction are determined (step S7) and a command signal is transmitted (step S8).

Here, FIG. 9 illustrates the command signal emitted by the antenna 1b of the reader/writer #1 (#2) and the response signal from tag 2a(2b).

Figure 9A:
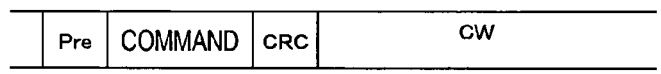
FIG. 9 illustrates a command signal that is emitted by the antenna 1b of the reader/writer #1 (#2) and a response signal from tag 2a(2b)

As shown in FIG. 9A, the reader/writers #1 and #2 employs the determined usage channel and antenna polarized direction, for example, right-handed circular polarization, to modulate the continuous wave CW by means of a command signal and a preamble Pre and a frame signal with a check signal CRC before and after the command signal respectively.

Figure 9B:
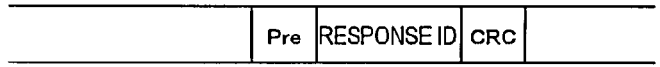

When the tags 2a and 2b receive the command signals from the corresponding reader/writers #1 and #2, as shown in FIG. 9B, the continuous wave CW is modulated by means of a frame signal that likewise has a preamble Pre and check signal CRC before and after same by taking the characteristic information and identification information of goods with tags the tag information, whereupon the continuous wave CW is reflected toward the corresponding reader/writers #1 and #2.

The reader/writers #1 and #2 receive the response signal and end the communications (step S10).

Figure 10:
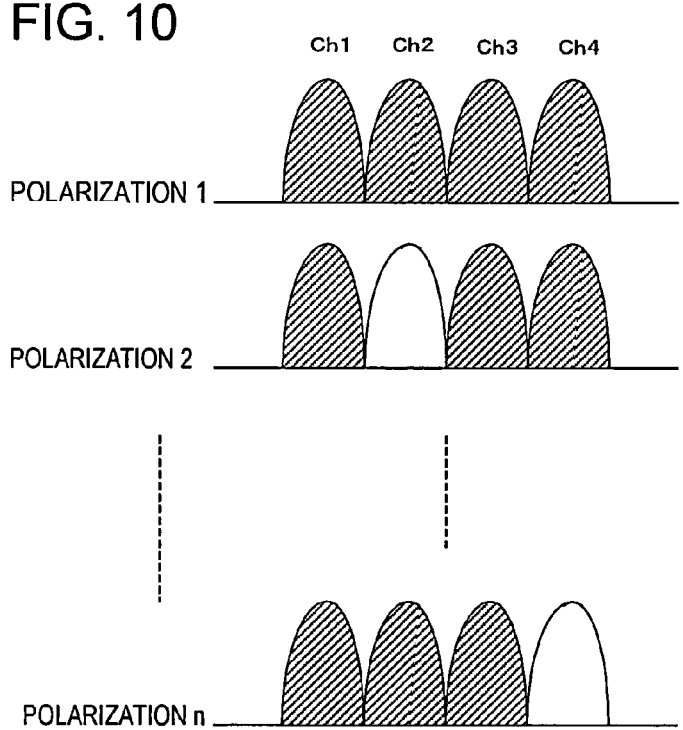
FIG. 10 shows the relationships between the channels Ch1 to Ch4 and the polarization directions 1 to n that are determined by the embodiment flow of FIG. 8.

FIG. 10 shows the relationship between the channels Ch1 to Ch4 determined by the embodiment flow of FIG. 8 and the polarization direction 1 to n. In FIG. 10, the shaded zones represent the fact that the interference signal level is equal to or less than the threshold value and the corresponding channel (frequency bandwidth) and polarization can be used in the reader/writer.

Further, although a constitution in which the reader/writer has one antenna 1b and the polarization direction of the antenna is switched was illustrated in the above description, the applications of the present invention are not limited to or by such a constitution. In other words, as shown in FIG. 11, a constitution in which a plurality of antennae 101b to 10nb for which the respective specified polarization direction is set are connected to the reader/writer main body section 1a and selection control is exercised in order to render effective a specified antenna that corresponds with the polarization to be set by the reader/writer main body section 1a is also possible.

Figure 11:
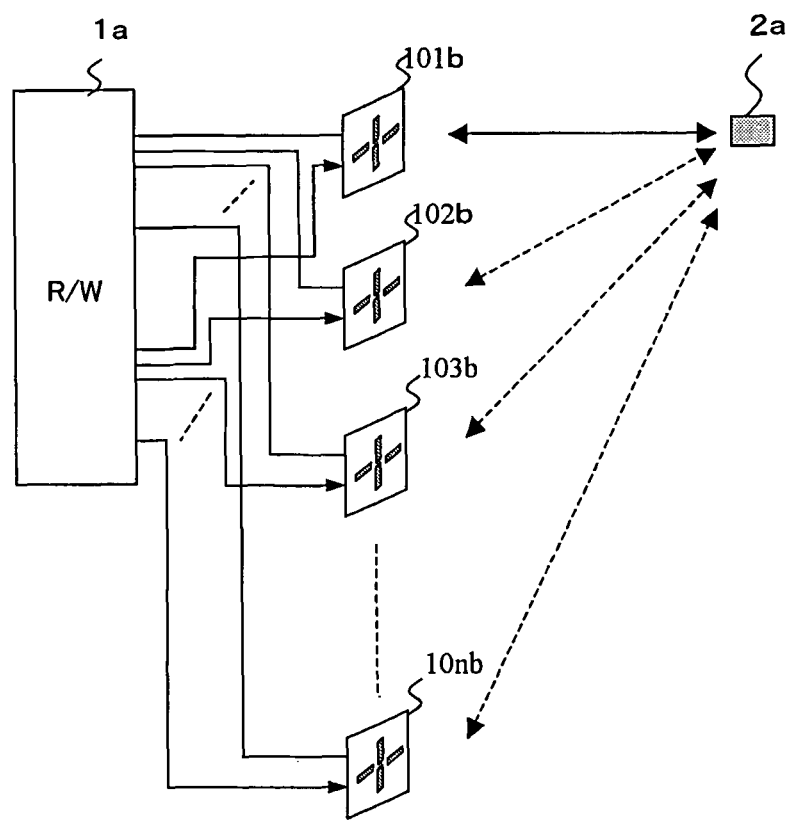
FIG. 11 shows an embodiment that uses a plurality of antennae for each of which a specified polarization direction is set.

Moreover, in FIG. 11, in an aspect in which variable control of the polarization direction of each of the plurality of antennae 101b to 10nb is possible as shown in FIG. 5 or 6, a search for channels permitting free communication is possible with a smaller antenna.

INDUSTRIAL APPLICABILITY

As described hereinabove, whereas, in a conventional method, the constitution is such that a search is performed only for a useable channel in fixed polarization, according to the present invention, a search for a state where the interference signal level is equal to or less than the threshold value is performed using a combination of the channel and polarization direction. An RFID system that permits a higher probability that a spare channel will be detected and reduces the effects of interference between reader/writers can be provided from the features of such a constitution. Accordingly, the present invention makes a large contribution to industry.

The invention claimed is:

1. An RFID system, comprising:
   a reader/writer which has a controller section and a plurality of antennae each with characteristic polarization, and which sends a continuous carrier wave; and
   a tag which uses tag information to modulate the continuous carrier wave and sends back a response signal to the reader/writer, wherein
   the controller section judges prior to send the continuous carrier wave, the level of the interference signal received from another reader/writer by switching each of the plurality of antennae for each of the plurality of channels and determines a channel and antenna for which the judged level of the interference signal is equal to or less than the threshold value, and receives a response signal from the tag by means of the determined antenna via the determined channel,
   wherein the channels are the respective bands of a frequency band that has been divided into a plurality of bandwidths.

2. The RFID system according to claim 1, wherein the tag is constituted by a patch antenna and an LSI which is connected in parallel to the patch antenna and which has an interface section having a capacitance component that resonates with the inductance component.

3. A carrier sensing method of an RFID system which has a reader/writer that has a-controller section and a plurality of antennae each set with a different polarization direction, and which sends a continuous carrier wave, and a tag which uses tag information to modulate the continuous carrier wave and sends back a response signal to the reader/writer,
   the method comprising the steps of: in the reader/writer,
   sequentially measuring prior to send the continuous carrier wave, an interference signal level received from another reader/writer by switching each of the plurality of antennae for each of the plurality of channels;
   measuring the interference signal level by switching the specified channel to another channel when the interference signal level to be measured is equal to or more than the threshold value;

determining an antenna set to a channel and polarization direction for which the interference signal level thus measured does not exceed the threshold value; and setting to receive the response signal from the tag using the determined channel and antenna, wherein the channels are the respective bands of a frequency band that has been divided into a plurality of bandwidths.

4. The RFID system according to claim 3, wherein the tag is constituted by a patch antenna and an LSI which is connected in parallel to the patch antenna and has an interface section having a capacitance component that resonates with the inductance component.

\* \* \* \* \*